3,239,565
FATTY HYDROXYALKYL AMINES
Maurice M. Kreevoy, Minneapolis, Minn., and Kirtland E. McCaleb, Oakland, Calif., assignors to General Mills, Inc., a corporation of Delaware
No Drawing. Filed June 7, 1962, Ser. No. 200,646
10 Claims. (Cl. 260—584)

The present invention relates to novel difatty hydroxyalkyl amines. It also relates to the use of such difatty hydroxyalkyl amines in liquid-liquid ion exchange extraction processes.

It is known that molybdenum and/or unranium can be extracted from ores containing the same using certain amine extractants. In a typical extraction process the ore is leached with an aqueous acid solution such as sulfuric acid in order to produce a solution containing the molybdenum and/or unranim values. The metal values are extracted from this aqueous solution by a non-aqueous amine solution and the said metal values are then recovered from the amine solution by an aqueous stripping solution. Both molybdenum and uranium are soluble in the acid leaching solution and in the amine extractant. When it is desired to separate molybdenum from uranium (for example, when the ores contain both of said metals), the metal pregnant amine solution is stripped with an aqueous solution which preferentially strips only the uranium values. Accordingly, the molybdenum tends to build up in the amine extractant, and it is necessary to bleed off a stream of this amine extractant for the purpose of stripping molybdenum from it.

It is found, however, that in ordinary operation moylbdenum seems to form some sort of complex with the amine extractant, which complex is insoluble and appears at the interface between the organic phase and the acid leaching solution and/or the aqueous stripping solution for the uranium. While the presence of these interfacial solids does not completely stop the operation, they must either be removed along the circuit or they will be lost—i.e., such solids have a tendency to precipitate in the extraction apparatus. Moreover, in the removal of these solids along the circuit, amine reagent is lost thus increasing reagent costs.

The amines used heretofore in the liquid-liquid ion exchange recovery of molybdenum and/or uranium values have generally been secondary or tertiary amines containing aliphatic hydrocarbon groups of from approximately 8 to approximately 22 carbon atoms. We have now discovered a new class of extractants for molybendum and/or uranium which have an unexpectedly low tendency to form insoluble complexes with moylbdenum during the extraction process.

Therefore, it is an object of the present invention to provide novel difatty hydroxalkyl amines.

Another object of the invention is to provide a process for the recovery of metal values, such as molybdenum and/or uranium, from aqueous solutions thereof.

These and other projects will become apparent from the following detailed description.

The difatty hydroxyalkyl amines of our invention have the general formula:

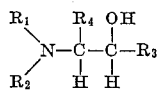

where $R_1$ and $R_2$ are aliphatic hydrocarbon radicals having from 8 to about 22 carbon atoms, $R_3$ is an aliphatic hydrocarbon radical having from 5 to about 22 cabon atoms and $R_4$ is hydrogen or a lower alkyl radical (1–5 carbon atoms). $R_1$, $R_2$ and $R_3$ may be straight or branched chain and may be saturated or unsaturated. Additionally $R_1$ and $R_2$ may be the same or different aliphatic hydrocarbon radicals and preferably contain from 8 to 18 carbon atoms. $R_3$ preferably contains about 5 to 14 carbon atoms and $R_4$ is preferably hydrogen or the methyl radical.

The difatty hydroxyalkyl amines are prepared by heating an excess of a difatty amine with a long chain expoxide, which is preferably a 1,2-epoxide or a 2,3-epoxide, such as 1,2-epoxydodecane, in the presence of an alcoholic solvent until the amount of unchanged secondary amine does not decrease significantly with further heating. The excess amine is then removed by vacuum distillation to leave the difatty hydroxyalkyl amine as a residue. The following examples further illustrate the preparation of the difatty hydroxylalkyl amines of the present invention.

EXAMPLE A

A charge of 3443 grams of dinonyl amine was added to 384 grams of isopropanol in a twelve-liter, three-neck, round bottom flask equipped with a mechanical stirrer, a thermometer and a reflux condenser. This solution was heated to 50° C. and a total of 1305 grams of 1,2-epoxydodecane was added in seven portions over a three hour period. The reaction mixture was then heated gradually to 100° C. and held at that temperature for a period of 144 hours before the amine value leveled off. The isopropanol and excess dinonyl amine were then removed under vacuum to leave 2711 grams of residue having a total amine value of 123.7, a tertiary amine value of 119 and a hydroxyl value of 125. The product, N-(β-hydroxydodecyl) dinonyl amine, has theoretical tertiary amine and hydroxyl values of 123.8.

EXAMPLE B

Example A was repeated using dinonyl amine and the commercially available mixture of 2,3-epoxyoctane and 1,2-epoxyoctane (so-called octylene oxide). Additionally, methyl Cellosolve was used as the solvent instead of isopropanol and the reaction was conducted at 145° C. for 430 hours at which point the amine value leveled off. Vacuum stripping left a residue with a total amine value of 137.7 and a tertiary amine value of 120.3. The product, which was a mixture of N-(β-hydroxyoctyl) dinonyl amine and N-(α-methyl-β-hydroxyheptyl) dinonyl amine, has a theoretical tertiary amine value of 141. The yield of the amine mixture was 85.4% of the theoretical.

EXAMPLE C

Example A was repeated using didodecyl amine and 1,2-epoxydodecane. The mixture was reacted at 115° C. for 50 hours to yield a residue, after vacuum stripping, having a total amine value of 106, a tertiary amine value of 96.3 and a hydroxyl value of 107.8. The product, N-(β-hydroxydodecyl) didodecyl amine, has theoretical tertiary amine and hydroxyl values of 104. The yield of the amine was 71% of the theoretical.

As indicated above, the present invention also involves the process of extracting molybdenum and/or uranium values from aqueous solutions thereof. In extraction of metal values, the process broadly comprises contacting a metal containing aqueous solution with a water immiscible organic phase containing the difatty hydroxyalkyl amine whereby the metal values are preferentially extracted into the organic phase. The loaded organic phase is separated from the aqueous solution by virtue of their immiscibility. The metal values are then stripped from the loaded organic phase by contacting it with water containing a stripping agent. The metal values can be recovered from the stripping solution by conventional means.

The process has particular application to the recovery of molybdenum and/or uranium from ores containing the same. In such processes, the finely divided ore is leached with a strong mineral acid such as sulfuric or hydrochloric. Sulfuric acid is preferred because of its low cost. This leaching step dissolves the uranium and/or molybdenum, iron, and aluminum principally, and the separation process involves the isolation of the uranium and/or molybdenum from this solution. The acid leach solution is then subjected to a liquid-liquid extraction with any of the described difatty hydroxyalkyl amines. The organic phase amine extractant is immiscible with the aqueous phase, and the uranium and/or molybdenum is transferred from the aqueous phase into the organic phase. The process involved is essentially an ion exchange reaction. The difatty hydroxyalkyl amines represent anion exchange reagents. Since both uranium and molybdenum in their acid leach solutions exist in equilibriums involving said metals in the form of anions and cations, they can be "solvent extracted" by the difatty hydroxyalkyl amines as anion exchange reagents, the removal of uranium and molybdenum anions causing the equilibrium to shift until all of the uranium and molybdenum are removed. Other metals, such as iron and aluminum, which are present in the acid leach solution, exist only as cations in the pH range involved, and accordingly, these metals are not picked up by the difatty hydroxyalkyl amine extractants.

The uranium- and/or molybdenum-pregnant amine reagent is then separated from the acid leach solution and subjected to a stripping operation. Thus it can be contacted with an aqueous solution generally consisting of sodium chloride acidified with sulfuric acid. This solution readily strips uranium from the organic phase. Molybdenum ions, however, are not readily removed by such stripping agents as acidified sodium chloride solutions. An aqueous solution of sodium carbonate is effective for stripping molybdenum from the difatty hydroxyalkyl amines. Accordingly, a "bleed stream" of the uranium barren organic phase (i.e., after the stripping thereof with the acidified salt solution) is routed through a sodium carbonate strip solution which removes the molybdenum. The bleed stream of amine reagent is then combined with the main stream of reagent for recycling to the operation. In this manner the molybdenum concentration in the organic phase is held at a definite level. The uranium and molybdenum can be recovered from the stripping solutions by conventional means.

When the starting ores do not contain uranium, the acidified salt solution stripping step can be dispensed with and the molybdenum-pregnant amine reagent can be stripped directly with the sodium carbonate solution to remove molybdenum therefrom.

Our process, as above-described, overcomes one of the principal problems connected with liquid-liquid ion exchange recovery of molybdenum and/or uranium from molybdenum. Thus, we have discovered that the difatty hydroxyalkyl amines have an unexpectedly low tendency to form insoluble complexes with the molybdenum. Such complexes cause loss of efficiency and loss of reagent during the extraction operations. We have also discovered that other hydroxyamines such as those which have only a short chain hydroxyalkyl group do not have this reduced tendency to form insoluble complexes with molybdenum.

The liquid-liquid extraction process can be carried out on a single stage batch basis or in a continuous countercurrent mixer-settler unit. The number of stages can be varied as desired, depending on the efficiency of extraction and stripping. By adjustment of the relative volumes of aqueous uranium and/or molybdenum pregnant solution, organic difatty hydroxyalkyl phase and stripping solution(s) introduced to the liquid-liquid extraction apparatus, it is possible to achieve a high degree of uranium and/or molybdenum concentration. When a bleed stream is being taken off for the removal of molybdenum, it can generally be 20 percent by volume of the organic phase or less. Bleed streams down to as little as 5 percent of the organic phase being recycled have been found effective for maintaining the molybdenum level low enough for numerous cycles of the organic circuit when uranium is to be the principal recovered metal.

It is also understood that the aqueous solutions are not confined to those obtained from acid leaching of ores. Thus uranium and/or molybdenum containing aqueous solutions can be extracted by our process regardless of their derivation.

The stripping of the uranium-pregnant difatty hydroxyalkyl amine reagent is generally accomplished with an aqueous solution of an inorganic salt. The use of sodium chloride has been described above. However, other inorganic salts such as sodium sulfate, sodium nitrate and the corresponding potassium and ammonium salts can likewise be used. The stripping solutions are generally acid and have a pH below 7.0. Such solutions may be sufficiently acid as to have a pH approaching 0.

Stripping of molybdenum, either directly or from a bleed stream, is preferably accomplished by means of a sodium carbonate solution. However, any alkaline solution having a pH in excess of 7 may be used. Such solutions may comprise alkali metal hydroxides or carbonates or alkaline earth metal hydroxides.

In addition to the difatty hydroxyalkyl amines of our invention, the organic phase generally contains other materials, such as a conditioner, which typically is a long chain aliphatic alcohol such as capryl alcohol, isodecanol, tridecyl alcohol or 2-ethyl hexanol, or a high molecular weight phenol such as dodecylphenol, and a diluent. Suitable diluents are aliphatic hydrocarbons, aromatic solvents, aromatic petroleum fractions, ketones, nitrohydrocarbons and chlorinated solvents. Examples of these solvents are: benzene, toluene, xylene, Skellysolve B, chloroform, fuel oil and kerosene. The composition of the organic phase is not critical. It is only necessary that the difatty hydroxyalkyl compound be present in an amount sufficient to extract the uranium and/or molybdenum or mineral acids from the aqueous solutions. Generally, the difatty hydroxyalkyl amine will be present in an amount of from about 2 to about 50% by volume based on the total organic phase. It is, however, preferred that the organic phase consist of from 5 to 15 volume percent of the difatty hydroxyalkyl amine, the remainder being the diluent. If a conditioner is present, it will be used in amounts of from about 2 to 10 volume percent.

The invention is further described by the following examples. Said examples are illustrative only and do not constitute limitations on the invention.

EXAMPLES I–VIII

Aqueous feed solutions containing 1 g./l. of either Mo(VI) or U(VI) and which were 1 M sulfate and had a pH of about 1 were extracted with 0.1 M solutions of various difatty hydroxyalkyl amines in kerosene which also contained 5% by volume isodecanol. The extractions were performed on a single stage batch basis in separatory funnels at ambient room temperature. The organic solvent was first added to the funnels followed by addition of the aqueous feed (organic:aqueous ratio of 1:2). The funnels were shaken to equilibrate the mixtures and then the phases were allowed to separate. The extraction coefficient, $E_a°$, was determined for each of the extractions. The results are set forth in the following Table I.

*Table I*

| Example | Difatty Hydroxyalkyl Amine Prepared From | | Extraction Coefficient $E_a°$ [1] | |
|---|---|---|---|---|
| | Secondary Amine | Epoxide | U (VI) | Mo (VI) |
| I | Dioctyl | 1,2-epoxydodecane | 7.3 | 67 |
| II | Dinonyl | do | 10.2 | 212 |
| III | Didecyl | do | 8.7 | 85 |
| IV | Didodecyl | do | 7.4 | 95 |
| V | Dioctyl | Mixture of 1,2-epoxyoctane and 2,3-epoxyoctane. | 4.0 | 85 |
| VI | Dinonyl | do | 4.3 | 74 |
| VII | Didecyl | do | 4.6 | 106 |
| VIII | Didodecyl | do | 5.4 | 74 |

[1] $E_a° = \frac{\text{[metal conc.] organic}}{\text{[metal conc.] aqueous}}$.

The data of Table I shows that a variety of the difatty hydroxyalkyl amines of our invention are excellent extractants for both U(VI) and Mo(VI). The compounds of our invention also have an unexpectedly low tendency to form insoluble complexes with molybdenum as is shown by the following examples.

EXAMPLE IX

An aqueous feed solution containing 6.9 g./l. Mo (as $Na_2MoO_4$) and having a pH of 1.0 and a sulfate content of 1.0 M. was extracted with an organic solvent comprising 50 milliliters of 0.1 M N-(β-hydroxydodecyl) dinonyl amine in kerosene and 5 milliliters of isodecanol. Fifty milliliter portions of the aqueous feed solution are contacted with the organic phase in a separatory funnel with shaking at ambient room temperatures. After each extraction, the raffinate was removed and a fresh amount of the aqueous feed solution was contacted with the organic phase. This procedure was repeated until the organic phase was loaded with molybdenum. The results are set forth in the following Table II.

*Table II*

| Extraction | Mo in Aqueous g./l. | | Mo in Organic g./l. Accumulative |
|---|---|---|---|
| | Initial | Final | |
| 1 | 6.90 | 0.142 | 6.143 |
| 2 | 6.90 | 1.63 | 10.933 |
| 3 | 6.90 | 5.2 | 12.47 |
| 4 | 6.90 | 6.07 | 13.22 |
| 5 | 6.90 | 5.87 | 14.16 |
| 6 | 6.90 | 6.20 | 14.80 |
| 7 | 6.90 | 6.50 | 15.16 |
| 8 | 6.90 | 6.33 | 15.58 |
| 9 | 6.90 | 6.55 | 15.90 |
| 10 | 6.90 | 7.07 | |
| 11 | 6.90 | 6.90 | |

This example shows that the organic phase containing N-(β-hydroxydodecyl) dinonyl amine can be loaded with large amounts of molybdenum. The organic phase was completely loaded after contacting it with nine fresh solutions of the aqueous feed. No third phase occurred —i.e., no insoluble molybdenum complex formed at the interface of the organic phase and the aqueous feed solution.

EXAMPLE X

Example IX was repeated except that N-(β-hydroxyethyl) dinonyl amine was substituted for N-(β-hydroxydodecyl) dinonyl amine in the organic phase. The organic phase contained 6.19 g./l. molybdenum after 1 extraction and 11.09 g./l. after contact thereof with a second 50 milliliter portion of the aqueous feed solution. An insoluble complex or third phase occurred during this second extraction.

A comparison of the data of Examples IX and X shows that the compounds of the present invention are unexpectedly superior to similar compounds having short chain hydroxyalkyl groups. Thus, no insoluble complex was formed after nine extractions in Example X (the organic phase was loaded with molybdenum) while an insoluble complex was formed during the second extraction in Example XI (the organic phase was not loaded with molybdenum). As indicated previously, the formation of an insoluble molybdenum complex is highly undesirable because it reduces the efficiency of the extraction and generally causes a loss of the extractant.

EXAMPLES XI–XIII

These examples show further the reduced tendency of the difatty hydroxyalkyl amines of our invention to form insoluble complexes with molybdenum. An aqueous feed solution containing 7.0 g./l. Mo (as $Na_2MoO_4$) and having a pH of 1.0 and a sulfate content of 1.0 M was extracted as in Example X wth equal volumes of 1.0 M solutions of various difatty hydroxy amines in kerosene (the kerosene also contained 5% by volume isodecanol). The shaking and settling process in the separatory funnels was repeated with fresh portions of the aqueous solution until third phase occurred. The results of these tests are summarized in the following Table III.

*Table III*

| Example | Difatty Hydroxyalkyl Amine Prepared From— | | Number of Extractions Before Third Phase Occurred |
|---|---|---|---|
| | Secondary Amine | Epoxide | |
| XI | Didecyl | 1,2-epoxydodecane | 13 |
| XII | Didodecyl | do | 9 |
| XIII | do | Mixture of 1,2-epoxyoctane and 2,3-epoxyoctane. | 9 |

EXAMPLE XIV

An aqueous feed solution (Shattuck acid leach liquor) having the following analysis:

Mo _____ g./l__ 6.93
Fe _____ g./l__ 2.64
Cu _____ g./l__ 1.97
$SO_4$ _____ g./l__ 18.90
pH _____ 1.3
E.M.F. _____ mv__ 6.50 was extracted with an organic solvent consisting of 90 volume percent kerosene, 5 volume percent isodecanol and 5 volume percent N-(β-hydroxydodecyl) dinonyl amine. The extraction was conducted in a liquid-liquid extraction circuit containing three extraction stages and two stripping stages. The organic to aqueous phase ratio in the extraction stage was 1:4. The stripping solution was 120 g./l. $Na_2CO_3$ and the temperature of the organic-aqueous mixture in the first stripping stage was kept at 120–130° F. The process was conducted continuously through a series of cycles of the organic flow and the results are set forth in Table IV which follows:

Table IV

| Cumulative Hours of Operation | Cycles of Operation Based on Organic Flow | Normality of Amine in Organic Phase | Mo Concentration (g./l.) | | | Percent Extraction |
|---|---|---|---|---|---|---|
| | | | Raffinate | Organic | | |
| | | | | Loaded | Stripped | |
| 0 | 0 | 0.968 | | | | |
| 5 | 10 | 0.0985 | 0.084 | 9.77 | 0.013 | 98.8 |
| 13 | 26 | 0.1005 | 0.070 | 9.73 | 0.004 | 99.0 |
| 21 | 42 | 0.1015 | 0.074 | 9.45 | 0.008 | 98.9 |
| 29 | 58 | 0.1015 | 0.058 | 10.10 | 0.012 | 99.2 |
| 37 | 74 | 0.1050 | 0.060 | 9.95 | 0.008 | 99.1 |
| 45 | 90 | | 0.050 | 9.68 | 0.036 | 99.3 |
| 53 | 106 | | 0.060 | 9.45 | 0.015 | 99.1 |
| 61 | 102 | 0.1085 | 0.039 | 9.46 | 0.009 | 99.4 |
| 69 | 138 | | 0.036 | 9.28 | 0.009 | 99.5 |
| 77 | 154 | 0.1087 | 0.035 | 9.76 | 0.034 | 99.5 |

The above example shows that molybdenum containing acid leach liquors can be continuously extracted using the difatty hydroxyalkyl amines of the present invention with excellent results. Thus at the end of 77 hours or 154 cycles the percent extraction was still 99.5. Additionally no insoluble complexes or third phase were formed during the above continuous extraction. Amine losses as a result of solubility in the aqueous phases or as a result of the formation of molybdenum-amine complexes were negligible. The slight increase in amine concentration in the organic phase was due to kerosene evaporation.

EXAMPLE XV

An aqueous feed solution (Kermac molybdenum-chloride pregnant alkaline waste scrub solution) having the following analysis:

Mo _____ g./l__ 1.84
$U_3O_8$ _____ g./l__ 0.036
Cl _____ g./l__ 16.8
pH _____ 8.9 was neutralized with concentrated sulfuric acid to a pH of 2.0 and was then continuously extracted in the same manner as the feed solution of Example XIV. The organic solvent in this example consisted of 95 volume percent kerosene, 2.5 volume percent isodecanol and 2.5 volume percent N-($\beta$-hydroxydodecyl) dinonyl amine. The stripping solution contained 1 N sodium hydroxide and 0.7 N sodium chloride. The results of the continuous extraction are set forth in Table V.

Table V

| Cumulative Hours of Operation | Amine in Org. Phase Vol. Percent | Mo Concentration (g./l.) | | |
|---|---|---|---|---|
| | | Raffinate | Organic | |
| | | | Loaded | Stripped |
| 0 | 2.47 | | | |
| 18 | 2.60 | 0.007 | 4.20 | 0.014 |
| 26 | 2.64 | 0.038 | 4.20 | 0.009 |
| 34 | 2.74 | 0.035 | 4.30 | 0.014 |
| 42 | 2.80 | 0.034 | 4.40 | 0.009 |
| 50 | 2.91 | 0.037 | 3.70 | 0.001 |
| 58 | 3.00 | 0.018 | 4.40 | 0.033 |
| 66 | 3.04 | 0.031 | 4.40 | 0.011 |
| 74 | 3.08 | 0.017 | 4.60 | 0.003 |
| 80 | 3.12 | 0.015 | 4.50 | 0.059 |
| Average | | 0.026 | 4.30 | 0.017 |

The above data further show the excellent extraction of molybdenum in continuous runs. The eighty hour (about 50 cycles) average molybdenum extraction was 98.7 percent and the eighty hour average stripping efficiency was 99.4 percent. Again the concentration of N-($\beta$-hydroxydodecyl) dinonyl amine in the organic phase increased during the run as a result of kerosene evaporation indicating a negligible amount of amine loss due to aqueous solubility of the amine or interfacial molybdenum-amine complex formation.

Calcium molybdate was recovered from the composite aqueous stripping concentrate. Such composite had the following analysis:

Constituent: Grams/liter
Mo _____ 35.2
$SO_4$ _____ 2.15
Cl _____ 31.7
$U_3O_8$ _____ 0.02
$Na_2CO_3$ _____ 14.6
$NaHCO_3$ _____ 30.8
pH _____ 11.9

To a 500 milliliter portion of the composite was slowly added a calcium chloride solution (500 g./l.) so that 1.6 pounds of calcium chloride were used for each pound of molybdenum in the composite. The mixture was agitated for 30 minutes at ambient temperatures (25° C.). The precipitated calcium molybdate product was filtered and washed in three stages using 50 milliliters of water for each stage. The filter cake was oven dried at 105–120° C. The dried product contained 95.9 percent pure calcium molybdate and was 99.67 percent of the molybdenum in the 500 milliliter composite portion. This shows that molybdenum leach liquors can be extracted by our difatty hydroxyalkyl amines and that a valuable product, calcium molybdate, can be recovered in high yield and high purity from the stripping solution.

EXAMPLE XVI

An aqueous feed solution having the following analysis:

$U_3O_8$ _____ g./l__ 1.40
Mo _____ g./l__ 0.147
Cl _____ g./l__ 0.22
pH _____ 0.6
E.M.F. _____ mv__ 373 was extracted in a one-stage organic-continuous-mixer-settler unit with an organic solvent consisting of 92 volume percent kerosene, 3 volume percent isodecanol and 5 volume percent N-($\beta$-hydroxydodecyl) dinonyl amine. The aqueous:organic phase ratio was 5:1. After the extraction the organic phase contained 5.16 g./l. $U_3O_8$ and 0.41 g./l. Mo. Thus uranium and molybdenum can be coextracted from leach liquors. The extractions can be made continuous by stripping with an acidified salt solution and stripping a bleed stream of the organic phase with an alkaline stripping solution to maintain the molybdenum content below any desired concentration. Such a process has the advantage of no third phase or insoluble molybdenum-amine complex formation.

It is to be understood that the invention is not to be limited to the exact details of operation or the exact compositions or processes shown or described, as obvious modifications and equivalents will be apparent to those skilled in the art and the invention is to be limited only by the scope of the appended claims.

The embodiments of the invention in which an exclusive property or privilege is claimed are defined as follows:

1. An amine having the general formula:

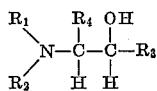

wherein $R_1$ and $R_2$ are aliphatic hydrocarbon radicals of from 8 to about 22 carbon atoms, $R_3$ is an aliphatic hydrocarbon radical of from 5 to about 22 carbon atoms and $R_4$ is a lower alkyl radical.

2. The amine of claim 1 wherein $R_1$ and $R_2$ are aliphatic hydrocarbon radicals of from 8 to 18 carbon atoms.

3. The amine of claim 1 wherein $R_3$ is an aliphatic hydrocarbon radical of from 5 to 14 carbon atoms.

4. The amine of claim 1 wherein $R_4$ is methyl.

5. N-($\beta$-hydroxydodecyl) dinonyl amine.

6. N-($\beta$-hydroxydodecyl) didecyl amine.

7. N-($\beta$-hydroxydodecyl) didodecyl amine.

8. An amine having the general formula:

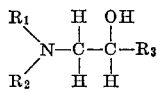

wherein $R_1$ and $R_2$ are aliphatic hydrocarbon radicals of from 8 to about 22 carbon atoms and $R_3$ is an aliphatic hydrocarbon radical of from 5 to about 22 carbon atoms.

9. The amine of claim 8 wherein $R_1$ and $R_2$ are aliphatic hydrocarbon radicals of from 8 to 18 carbon atoms.

10. The amine of claim 8 wherein $R_3$ is an aliphatic hydrocarbon radical of from 5 to 14 carbon atoms.

References Cited by the Examiner

UNITED STATES PATENTS

| | | | |
|---|---|---|---|
| 2,363,465 | 11/1944 | Senkus | 260—584 XR |
| 2,413,247 | 12/1946 | Senkus | 260—584 |
| 2,755,304 | 7/1956 | Bersworth et al. | 260—584 |
| 2,784,233 | 3/1957 | Kottler et al. | 260—584 |
| 2,953,601 | 9/1960 | Whitaker | 260—585 |
| 3,052,513 | 9/1962 | Crouse | 23—14.5 |
| 3,083,076 | 3/1963 | Drobnick et al. | 23—14.5 |

CHARLES B. PARKER, *Primary Examiner.*

CARL D. QUARFORTH, *Examiner.*

JERRY D. VOIGHT, ANTON H. SUTTO,
*Assistant Examiners.*